US 9,541,923 B2

(12) United States Patent
Van Kuilenburg et al.

(10) Patent No.: US 9,541,923 B2
(45) Date of Patent: Jan. 10, 2017

(54) SYSTEM OF AUTONOMOUS VEHICLES

(71) Applicant: Lely Patent N.V., Maassluis (NL)

(72) Inventors: Jan Martinus Van Kuilenburg, Maassluis (NL); Karel Van Den Berg, Maassluis (NL)

(73) Assignee: Lely Patent N.V., Maassluis (NL)

( * ) Notice: Subject to any disclaimer, the term of this patent is extended or adjusted under 35 U.S.C. 154(b) by 114 days.

(21) Appl. No.: 14/394,941

(22) PCT Filed: Mar. 14, 2013

(86) PCT No.: PCT/NL2013/050176
§ 371 (c)(1),
(2) Date: Oct. 16, 2014

(87) PCT Pub. No.: WO2013/157929
PCT Pub. Date: Oct. 24, 2013

(65) Prior Publication Data
US 2015/0073638 A1 Mar. 12, 2015

(30) Foreign Application Priority Data

Apr. 20, 2012 (NL) ...................................... 2008674

(51) Int. Cl.
*G05D 1/02* (2006.01)
*G08G 1/00* (2006.01)

(52) U.S. Cl.
CPC .......... *G05D 1/0289* (2013.01); *G05D 1/0291* (2013.01); *G08G 1/20* (2013.01)

(58) Field of Classification Search
CPC ....... G05D 1/0289; G05D 1/0291; G08G 1/20
See application file for complete search history.

(56) References Cited

U.S. PATENT DOCUMENTS 5,816,192 A 10/1998 Van Der Lely et al.
8,700,251 B1 * 4/2014 Zhu .......................... G05D 1/02
701/25

(Continued)

FOREIGN PATENT DOCUMENTS

EP  1840689 A2 * 10/2007 ........... G05D 1/0274
EP  2 169 501        3/2010

(Continued)

OTHER PUBLICATIONS

Wang, J., "Operating Primitives Supporting Traffic Regulation and Control of Mobile Robots under Distributed Robotic Systems", IEEE International Conference on Robotics and Automation, pp. 1613-1618, (May 21, 1995) XP 000701619.

(Continued)

*Primary Examiner* — Tuan C. To
(74) *Attorney, Agent, or Firm* — Oblon, McClelland, Maier & Neustadt, L.L.P.

(57) ABSTRACT

A system and method for control of the system, with a plurality of autonomous vehicles having intersecting routes, a control, an operational area, and a predefined place with positions provided with a vehicle presence detection device. The method includes detecting the presence of the vehicles in a detection device, and beginning to travel with a first vehicle according to a travel action. The travel action is chosen from travelling of a route through the operational area from a predefined place, and an advancing action within a predefined place from a first detection device to a second detection device which is not yet occupied. Beginning to travel is carried out only if each of the vehicles has been detected as present at one of the predefined places, or, at most one vehicle has the status "not present at one of the predefined places" if the travel action relates to an advancing action.

18 Claims, 3 Drawing Sheets

(56) References Cited

U.S. PATENT DOCUMENTS

| | | | | | |
|---|---|---|---|---|---|
| 8,838,292 | B2* | 9/2014 | Palm | ................... | G05D 1/0289 701/2 |
| 8,874,301 | B1* | 10/2014 | Rao | ................... | B60K 28/066 180/272 |
| 9,043,129 | B2* | 5/2015 | Bonefas | ................ | G05D 1/0223 701/300 |
| 9,134,721 | B2* | 9/2015 | Koehrsen | ............ | G05B 19/4061 |
| 2007/0132608 | A1* | 6/2007 | Votaw | ................. | G08G 1/0965 340/903 |
| 2008/0027599 | A1* | 1/2008 | Logan | ................... | G05D 1/0234 701/23 |
| 2010/0063954 | A1* | 3/2010 | Anderson | ............ | G05D 1/0221 706/50 |
| 2010/0076641 | A1 | 3/2010 | Van Den Berg | | |
| 2011/0029235 | A1* | 2/2011 | Berry | .................. | G01C 21/005 701/408 |
| 2011/0106362 | A1* | 5/2011 | Seitz | ................... | G05B 19/416 701/24 |
| 2012/0046820 | A1* | 2/2012 | Allard | .................... | H04L 67/12 701/25 |
| 2012/0072051 | A1* | 3/2012 | Koon | ................... | G05D 1/0278 701/2 |
| 2012/0083959 | A1* | 4/2012 | Dolgov | ................ | G05D 1/0214 701/23 |
| 2012/0083982 | A1* | 4/2012 | Bonefas | ................ | G05D 1/0223 701/70 |
| 2013/0238170 | A1* | 9/2013 | Klinger | .................. | G05D 1/104 701/3 |

FOREIGN PATENT DOCUMENTS

| | | | | |
|---|---|---|---|---|
| JP | EP 2065775 A1 * | 6/2009 | ............ | B25J 19/023 |
| WO | 96 14735 | 5/1996 | | |

OTHER PUBLICATIONS

International Search Report Issued Apr. 24, 2013 in PCT/NL13/050176 Filed Mar. 14, 2013.

* cited by examiner

SYSTEM OF AUTONOMOUS VEHICLES

BACKGROUND OF THE INVENTION

Field of the Invention

The invention relates to a system and a method for controlling such a system, of N unmanned autonomous vehicles, where N≥2, a control device for at least partially controlling at least one of the autonomous vehicles, an operational area with a floor over which the vehicles can move, wherein the vehicles are each configured to travel independently over one or more routes which are possible for that vehicle, wherein for at least one vehicle at least one of the possible routes intersects at least at one point with at least one possible route of another of the vehicles, and at least one predefined place which adjoins the operational area, with in total M predefined positions which are each provided with at least one detection device to detect the presence of one of the vehicles and to signal the presence to the control device, where M≥2. A system of this type with a plurality of autonomous vehicles is known per se.

Description of the Related Art

A situation known per se which can arise is that the vehicles can both travel in one and the same area, on routes which totally or partially overlap one another or intersect with one another at one or more points. To reduce the risk of collisions here, it is possible to allow the vehicles to communicate with one another directly or via a central control system regarding their positions. It is also possible to provide the vehicles with detection equipment and a controller which prevents collisions on the basis of detection by the detection equipment. However, solutions of this type require a substantial amount of communication traffic, with a risk of faults therein and consequently still a risk of collisions, and/or a substantial amount of detection equipment on each of the vehicles. Both of the aforementioned methods are complex and prone to faults.

BRIEF SUMMARY OF THE INVENTION

One object of the present invention is to provide a system and method of the type mentioned in the introduction, wherein collisions can be prevented in a simple and reliable manner. A further object is to achieve this with little or no communication with the vehicles.

The invention achieves at least one of these objects with a method according to Claim 1, in particular a method for controlling a system of N unmanned autonomous vehicles, where N≥2, a control device for at least partially controlling at least one of the autonomous vehicles, an operational area with a floor over which the vehicles can move, wherein the vehicles are each configured to travel independently over one or more routes which are possible for that vehicle, wherein for at least one vehicle at least one of the possible routes intersects at least at one point with at least one possible route for another of the vehicles, and at least one predefined place which adjoins the operational area, with in total M predefined positions which are each provided with at least one detection device to detect the presence of one of the vehicles and to signal the presence to the control device, where M≥2, wherein the method comprises the collecting in the control device of a presence status of each of the vehicles to determine a condition for the system, and wherein the presence status comprises the presence of the vehicle at a predefined place as detected by the at least one detection device provided there, determining on the basis of the presence statuses whether a condition is 'safe' for the system, controlling by means of the control device a first vehicle to perform a travel action only if the condition is identified as 'safe' for the system and for this travel action, wherein the travel action is chosen from a route travel action, comprising the travelling of a route through the operational area, starting from one of the predefined places, and an advancing action, comprising the travelling within one of the predefined places from a first detection device to a second detection device which is not yet occupied, and wherein the condition is 'safe' if the travel action relates to a route travel action or an advancing action, and each of the vehicles has a presence status "detected as present at one of the predefined places", and at most one vehicle has the status "not present at one of the predefined places".

With the invention, hardly any or no communication needs to take place with the vehicles, at least as far as their position is concerned, given that the detection ascertains only whether the vehicles are (each) near a detection device at a position in a predefined area. The detection devices can therefore be designed, for example, as specialised, such as sturdy and reliable, as there is no need, for example, for the detection device to be able to operate in a mobile manner, i.e. on a limited energy source and at variable places. Furthermore, the position of a detection device of this type according to the invention is determined without any doubt, so that there is also no need to take account of measurement uncertainties, e.g. due to noise or drift.

According to the method, either one vehicle can set off on a route through the operational area if all vehicles are known to be at a safe place, i.e. have been detected in a predefined area, in particular are parked there, or one vehicle can travel within such a predefined area if it is known that all vehicles minus at most one vehicle have been detected in a predefined area. In this last case, i.e. one vehicle has not been "detected", it is then assumed that the vehicle is located and travels a route outside the predefined area(s), and for this reason cannot collide with any vehicle within the predefined area(s), so that in this last case it can set off with little or no risk. Instead of this assumption, this can also be known in the control device. As a result of all this, a system is produced which has exchanged the flexibility of being able to travel any given routes at any time and in any place for a more restricted but simpler and more reliable, in principle communicationless, system.

The following comments are made here which apply to the entire application. The route may be chosen as fixed or may be dynamic, i.e. not fixed, and to be determined by the vehicle or an external control and possibly to be changed en route. Furthermore, the "intersection" of routes means here that essentially trivial cases where routes overlap only at their start and therefore end points are not envisaged. These at any rate do not have the problem that a collision could occur during the journey. In addition, "predefined place" here includes both a point and an area with a spatial extent, so that the predefined place, or the predefined places are in each case either a point or area within the operational area or possibly at the periphery thereof, or an area which lies outside but is adjacent to the operational area, in other words so that the predefined area and the operational area are in this case neighbouring or adjacent areas. Obviously, travelling within a predefined area the size of a point is not envisaged here.

The following general comments are made relating to the control device. The control device is in principle envisaged as external in relation to the one or more vehicles, and is then, for example, designed as a computer or comparable device. However, it is possible to distribute the control device among the vehicles, as equivalent vehicles or as one master vehicle and one or more slave vehicles, although this requires reciprocal communication between the vehicles, albeit not necessarily relating to their current positions. The control device furthermore controls at least one vehicle, and preferably all vehicles, at least partially, and at least gives the respective vehicle a decision or instruction to set off, and also an instruction relating to the route which must be travelled. The vehicle can then preferably travel the route entirely independently. Although it is in principle possible to have the navigation take place under the control of the control device, this would mean that communication takes place continuously between the vehicle and the control device.

Furthermore, the presence status of all vehicles is collected in the control device. The collection of the status of all detection devices is regarded as equivalent to this, so that information relating to the presence status of all vehicles is in fact collected. In any case, if, after counting, in the case of N or N−1 detection devices, the presence of a vehicle is detected, it can similarly be concluded therefrom that all vehicles are parked or only one vehicle is travelling. Moreover, the establishment of the condition of the system is envisaged functionally, so that a "safe" flag does not so much have to be indicated, but an equivalent conclusion must be involved somewhere in the method, e.g. to be carried out by an operating person or to be implemented in the control device. In fact, the following steps: 'collection in the control device of a presence status of each of the vehicles to determine a condition for the system, wherein the presence status comprises the presence of the vehicle at a predefined place as detected by the at least one detection device provided there, determining on the basis of the presence statuses whether a condition is 'safe' for the system, controlling a first vehicle by means of the control device to perform a travel action only if the condition has been designated as 'safe' for the system and for this travel action, wherein the travel action is chosen from: a route travel action, comprising the travelling of a route through the operational area, starting from one of the predefined places, and an advancing action, comprising the travelling within one of the predefined places from a first detection device to a second detection device which is not yet occupied, and wherein the condition is 'safe' if the travel action relates to a route travel action or an advancing action, and each of the vehicles has a presence status "detected as present at one of the predefined places", and at most one vehicle has the status "not present at one of the predefined places"' can therefore also be read as, and can therefore be replaced throughout the entire application with: "controlling by means of the control device of a first vehicle to perform a travel action, wherein the travel action is chosen from: 1) a route travel action, comprising the travelling of a route through the operational area, starting from one of the predefined places, and only if each of the vehicles is detected as present at one of the predefined places, or 2) an advancing action, comprising the travelling within one of the predefined places from a first detection device to a second detection device which is not yet occupied, and only if N or N−1 of the vehicles is detected as present at one of the predefined places".

Preferred embodiments of the method are described in the dependent claims. In particular, one embodiment comprises the counting of the number of vehicles with the presence status "detected as present at one of the predefined places", and determining that the condition of the system is "safe" if the number of vehicles is equal to N if the travel action involves a route travel action, or the number of vehicles is greater than or equal to N−1 if the travel action involves an advancing action.

Although the updating of the presence status can take place separately for each vehicle, this is not necessary per se in this form according to this embodiment. It is sufficient here to count the "present" presence statuses for all vehicles. If N−1 or N statuses are "present", an advancing action can be carried out, and if N statuses are "present", a route travel action can take place. Obviously, this makes a further simplification of, in particular, the control device, possible.

In a further embodiment, the method comprises, for a least one vehicle, to which the status "detected as present at one of the predefined places" applies, the performance of a first action at a first position within the predefined place, then the performance of an advancing action to a second position within the predefined place if the condition of the system is "safe", and performance of a second action, which differs from the first action. In cases where two different types of action must be carried out at two different positions for one and the same vehicle, it can be guaranteed according to the invention that this can be done safely. It is noted here that the actions must differ in their content and purpose. Trivial differences such as "action is carried out at a different time or different position" are expressly not envisaged here.

Although the actions are not deemed to be restricted in any way, in embodiments the first action comprises one of charging of energy, and loading of a material, or a combination thereof, and the second action comprises a different action of charging of energy, and loading of a material, or a combination thereof. Autonomous vehicles have their own energy supply on board, which must be replenished from time to time. The energy preferably comprises power, i.e. electricity, but, for example, fuel for a combustion engine can also be loaded. In addition, in a specific application, the material comprises animal feed. In any event, it is highly advantageous to use autonomous vehicles to feed animals, obviously with animal feed, as this can save a farmer a great deal of work. Note that, unlike, for example, drinking water, animal feed in most cases is not to be supplied via lines. Furthermore, in the case of larger livestock buildings, a plurality of vehicles, in this case therefore actual feeding devices, will often travel around in order to be able to feed all of the animals, given that the similarly autonomous filling of vehicles of this type with mixed rations can take a considerable amount of time, whereas high speeds are absolutely forbidden with animals, not only due to the risk of injury or fright, but furthermore because an unnecessary amount of energy is required.

A different material which can advantageously be loaded is a cleansing agent, particularly also water. An action of this type can advantageously be the shovelling together of manure. This is also a task which often occurs with animals, and the performance of which by autonomous vehicles can therefore save a lot of work. The cleansing agent, also comprising disinfectant, wetting agents and other additives, can support the task of shovelling together manure, and can of course run out. Since vehicles of this type can in principle carry out their work in the entire area where animals may be present, there is a risk of either collision with one another, or collision with one or more other vehicles such as feeding devices.

The invention also relates to a system of N unmanned autonomous vehicles where N≥2, a control device for at least partially controlling at least one of the autonomous vehicles, an operational area with a floor over which the vehicles can move, wherein the vehicles are each configured to travel independently over one or more routes which are possible for that vehicle, wherein for at least one vehicle at least one of the possible routes intersects at least at one point with at least one possible route of another of the vehicles, and at least one predefined place which adjoins the operational area, with in total M predefined positions which are each provided with at least one detection device to detect the presence of one of the vehicles and to signal the presence to the control device, where M≥2, wherein the control device is designed to carry out the method according to the invention, in particular for the collection in the control device of a presence status of each of the vehicles to determine a condition for the system, and wherein the presence status comprises the presence of the vehicle at one of the predefined locations as detected by the at least one detection device provided there, determining on the basis of the presence statuses whether a condition is 'safe' for the system, controlling by means of the control device a first vehicle to perform a travel action, only if the condition for the system and for this travel action is considered 'safe', wherein the travel action is chosen from a route travel action, comprising the travelling of a route through the operational area, starting from one of the predefined places, and an advancing action, comprising the travelling within one of the predefined places from a first detection device to a second detection device which is not yet occupied, and wherein the condition is 'safe' if the travel action relates to a route travel action or an advancing action, and each of the vehicles has a presence status "detected as present at one of the predefined places", and at most one vehicle has the status "not present at one of the predefined places". This system has the advantages already described for the method, and can advantageously be, for example, a farm environment, in particular a livestock building with animals which are fed.

Advantageous embodiments are described in the dependent claims. It is noted here that measures specified in the dependent system claims are also each applicable in any combination to the method according to the invention.

In particular, in the case of an advancing action which is to be carried out, the condition is designated as "safe" only if the at most one vehicle with the status "not present at one of the predefined locations" is carrying out a route travel action. This ensures with even greater reliability that no collisions will occur. It is furthermore advantageous if no route to be travelled during an advancing action intersects with any of the routes of any route travel action. This ensures that two vehicles using two positions can very safely change places. One vehicle is already located at a predefined place, while another is still travelling, in fact to a free position in the predefined area. When it has arrived there and has been detected, the situation remains that two vehicles are "present", and the system is therefore "safe". If the first vehicle then begins to travel, the second vehicle which arrived last can take the place of the first vehicle by carrying out an advancing action. Actions of this type may be necessary to transfer from a position with a first action to a position with a second action.

In embodiments, inter alia, for example, as described directly above, at least one predefined place comprises an area with a physical extent with at least two physically separated parking positions, each with its own detection device to detect the presence of one of the vehicles and to signal the presence to the control device. A predefined place of this type is then in fact a "safe area" with a plurality of safe positions, in this case parking spaces. If there is at least one free place, and the condition is sufficiently "safe", a vehicle can then go to a different safe position, or parking position within the predefined area, with an advancing action. A parking position of this type may furthermore itself also be elongated, i.e. the vehicle can stop at a plurality of physical positions within the parking position which, however, must be regarded as functionally equivalent, such as with very elongated charging strips for electrical charging.

In different, additional or alternative embodiments, at least one predefined place comprises a separate and single parking position which is completely encircled by the operational area. Parking positions of this type then in fact consist of a single point in the space, located within the operational area. Examples are charging points for power, or tap points for water. The control device which controls the routes of the vehicles can itself easily take this into account since, on detection of "present" at this parking position, the exact position of the parked vehicle is known.

As already partially indicated above, the invention comprises embodiments wherein at least one parking position comprises at least one charging device for the charging of energy, especially power, or a material, especially animal food or a cleansing agent such as water, or a combination thereof. Particularly if the operational area is a livestock building area with livestock, parking positions of this type are advantageous for reasons which have already been specified for the method.

In particular embodiments, a parking position with a feed-loading device, advantageously also a charging device, and also with a dedicated detection device to detect the presence of one of the vehicles and to signal the presence to the control device is provided at the at least one predefined place, and in total at least N−1, in particular at least N, separate charging devices are additionally provided at the at least one predefined place. One parking position, which may be elongated, is thus provided for loading feed, wherein at least one autonomous vehicle is preferably a feed (mixing) vehicle. This parking position is intended for loading feed. Furthermore, additional parking positions are also provided, wherein their number is preferably at least N−1, i.e. one fewer than the number of vehicles present, and advantageously at least as many as the same number of vehicles present. If there are precisely N−1 additional parking positions, there is in each case only one free space to return to, so that each vehicle must have its own parking position. If there are precisely N additional parking positions, each parked vehicle can go to one open space, which is sufficient, for example, in the case where the vehicle loaded with feed in each case drives off. A different vehicle can then advance to the parking position with the feed-loading device. This guarantees sufficient flexibility with minimal means.

In embodiments, the detection device is configured to measure an electrical parameter, especially a charge current, a conductivity or a resistance, and is furthermore configured to detect the presence status of a vehicle as "present" if the measured electrical parameter shows at least a predefined change or exceeds a predefined threshold value. This is a simple, reliable and favourable design of a detection device, in that this electrical charging is nevertheless already required for recharging electrically powered vehicles. Moreover, the measurement of electrical parameters of this type is very reliable and simple. Nevertheless, different detection devices are also possible, such as proximity sensors, IR sensors or other optical cameras, ultrasound devices, weight sensors, scanners, etc.

BRIEF DESCRIPTION OF THE SEVERAL VIEWS OF THE DRAWINGS

The invention will be explained below with reference to the drawing, in which a number of non-limiting examples are shown, and in which.

DETAILED DESCRIPTION OF THE INVENTION

Figure 1:
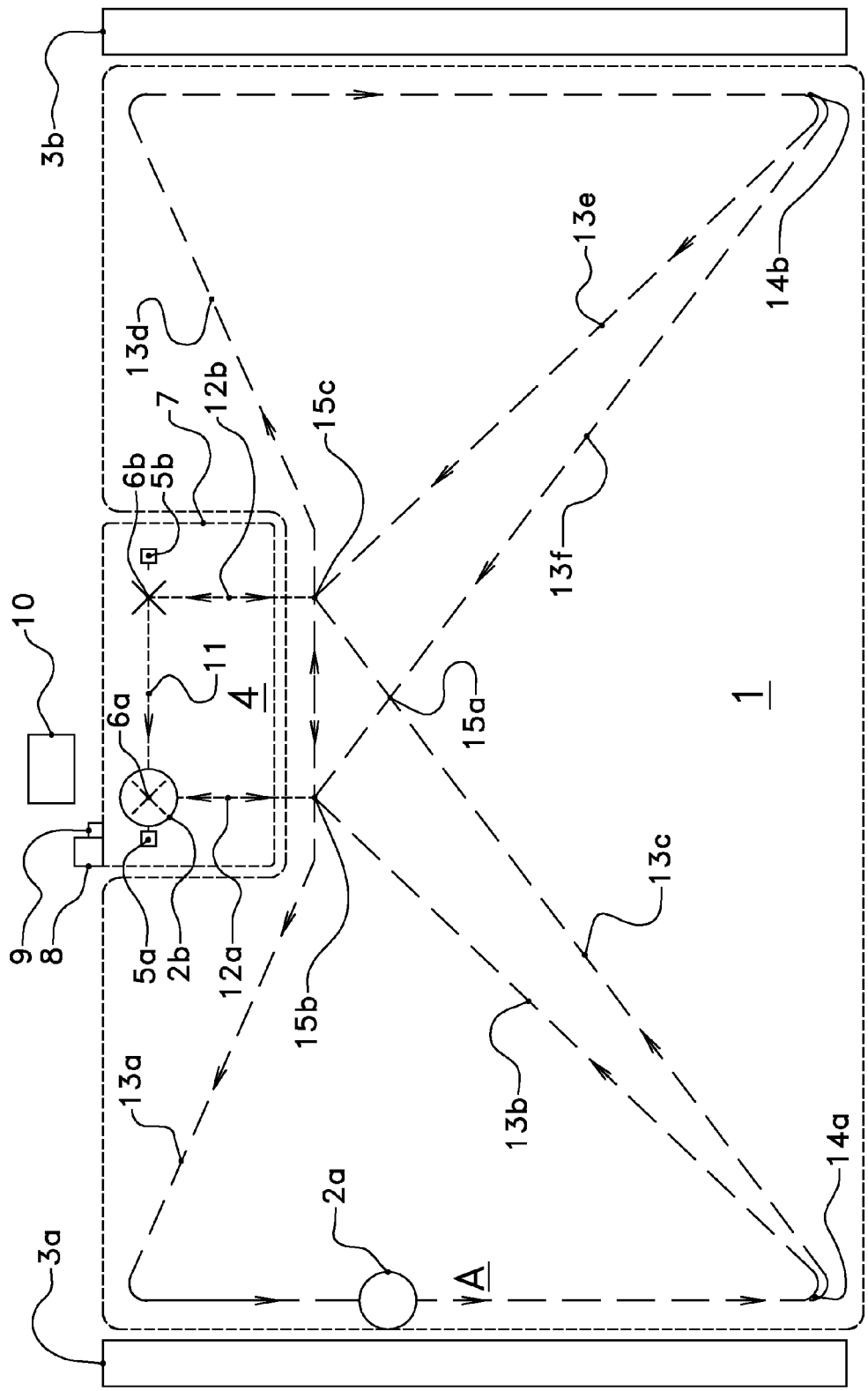
FIG. 1 shows a schematic top view of a system according to the invention.

FIG. 1 shows a schematic top view of a system according to the invention. Herein, 1 indicates an operational area in which a first and a second vehicle 2a, 2b are located. 3a and 3b are two feedways.

4 denotes a charging area in which two charging pillars 5a and 5b are located and which charging area is defined by the boundary 7. 8 denotes a control device, and 9 an ID device, and 10 denotes a feed-loading device. Furthermore, two charging positions 6a and 6b are indicated, between which an advancing route 11 is indicated. 12a and 12b denote two route start and end stages, which adjoin consecutive route stages 13a-13f.

14a and 14b denote two decision positions and 15a, 15b and 15c denote three intersection points.

In the system shown, the vehicle 2a moves in the arrow direction A along the feedway 3a. Here, the vehicle 2a comes along route stage 13a and will continue its path up to the decision point 14a. Either route stage 13b or route stage 13c will be chosen there on the basis of a route to be travelled. The route stage 13b will then take the vehicle 2a to the charging area 4, where it will arrive via the route end stage 12a at the charging position 6a. There, the vehicle 2a can be recharged with electricity at the charging pillar 5a, and can also be loaded with feed by means of the feed-loading device 10. Such actions can be performed under the control of the control device 8. The feed-loading device 10 is, for example, a grab jaw, a conveyor belt or any other device for releasing feed into the vehicle 2a, 2b. Here, the vehicles 2a, 2b are designed, for example, as feed-mixing vehicles or simply as feed vehicles. These are known per se from the prior art.

In order to determine that the feed-loading device 10 must load a vehicle 2a, 2b, the ID device 9 is provided, which can determine the presence of the vehicle 2b at the charging position 6a, for example by detecting an RFID chip on the vehicle 2b (not shown), by scanning a barcode or in any other known manner. Moreover, the ID device 9 is optional, since the presence can also be determined, for example, by means of the charging pillar 5a. In any case, if the vehicle 2b charges at the charging pillar 5a, a current will flow there, and/or a different voltage or resistance will be measured between the charge contacts of the charging pillar 5a. From this, a control device, for example the control device 8, can infer that a vehicle is located at the charging pillar 5a. It is important to note that it does not matter which vehicles are detected where, as far as the decision to begin to travel or not is concerned. Hence an ID device is optional, and only one detection device is required, with, for example, only one counting device to count the number of detected vehicles.

If the vehicle 2b is thus provided at the charging position 6a with electricity and/or feed, the time will come when the vehicle 2b again moves away from the charging pillar 5a, and also out of the charging area 4. In order to do this safely, the presence status of all vehicles, in this case therefore the vehicles 2a and 2b, is determined according to the invention. With regard to vehicle 2b, it is known here that it is located at the charging pillar 5a, in the charging area 4, which can be designated as the predefined area. It is at least known that a vehicle is located at a charging pillar. On the other hand, vehicle 2a moves through the operational area 1, which adjoins the charging area 4. If the vehicle 2b were also to enter the operational area 1, it cannot therefore be guaranteed that a collision will not occur, since the possible routes of the vehicles 2a and 2b may intersect with one another at a plurality of points, such as the intersection points 15a, 15b and 15c. The vehicle 2b will therefore be released by the control device 8 only if the vehicle 2a is also "safe", i.e. detected as present. Obviously, the control device 8 will also ensure here that the vehicle 2a does not go to the occupied charging position 6a, but to the charging position 6b. Once the vehicle 2a has arrived at the charging position 6b, the control device 8 can release the vehicle 2b from the charging position 6a. The vehicle 2a, with or without having been charged with electricity at the charging pillar 5b, can then proceed via the advancing route 11 to the charging position 6a, to be provided there with feed. This advancing action, i.e. travelling from the charging position 6b via the advancing route 11 to the charging position 6a, can be carried out if one vehicle travels or if all vehicles are detected as "present", provided that sufficient positions are available. This would not be the case in the present instance, given that only two charging positions 6a, 6b are available for two vehicles 2a, 2b. No free position would therefore be available for a vehicle which is to be advanced, if the other vehicle is also located at a charging position. It will nevertheless be clear that, if one or more additional charging positions is provided, an advancing action of this type can also take place if all vehicles are parked at a charging position.

Figure 2:
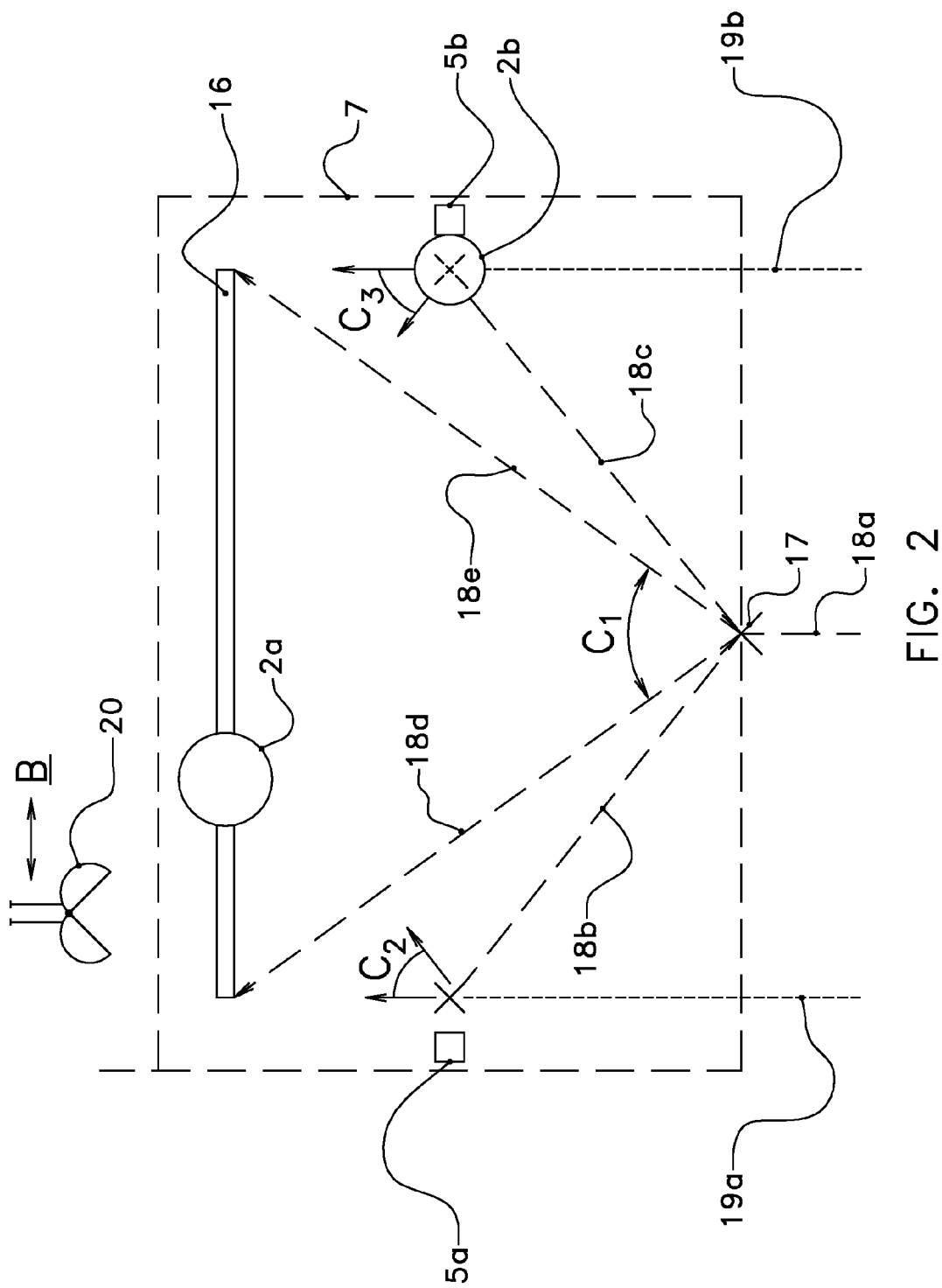
FIG. 2 shows a schematic top view of a different embodiment of the system according to the invention.

FIG. 2 shows a schematic top view of a different embodiment of the system according to the invention. As in the entire drawing, components of the same type are denoted with the same reference numbers.

The figure shows a section with a predefined area with a boundary 7, outside which the operational area is located. Vehicles generally arrive via the route option 18a to the entry position 17. There, the control device (not shown here) can control the vehicle to one of the charging pillars 5a and 5b, via the route options 18b and 18c respectively, or to an elongated loading area 16. This loading area comprises the area where a vehicle such as the vehicle 2a can be located as soon as the latter can be loaded by the loading grip jaw 20. The loading grip jaw 20 picks up, for example, feed from a "feed kitchen", which comprises different types of feed at different positions. As a result, the grip jaw 20 can in principle also approach the loading area at different positions, in FIG. 2 opposite the positions of the loading area 16. The vehicle 2a can thus reach the loading area 16 from the entry position 17 via the route options 18d and 18e, i.e. in the area indicated by the arrow $C_1$. Furthermore, it is possible for the vehicle 2b to reach the loading area 16 from the charging position at the charging pillar 5b by route options in the directions indicated by the arrow $C_3$. The route options from the charging position at the charging pillar 5a are also indicated by the arrow $C_2$.

Obviously, it is also possible for the vehicles 2a and 2b to enter the predefined area via a position other than the entry position 17, for example as indicated by the alternative entry routes 19a and 19b.

In the configuration shown, the two vehicles 2a and 2b may both be located at a charging pillar, 5a and 5b respectively. In such a case, an advancing action can take place, for example from the charging pillar 5a to the loading area 16, by travelling a route option in the area $C_2$. It suffices here if both vehicles are detected as "present", for example by measuring a charge current or contact resistance.

Figure 3:
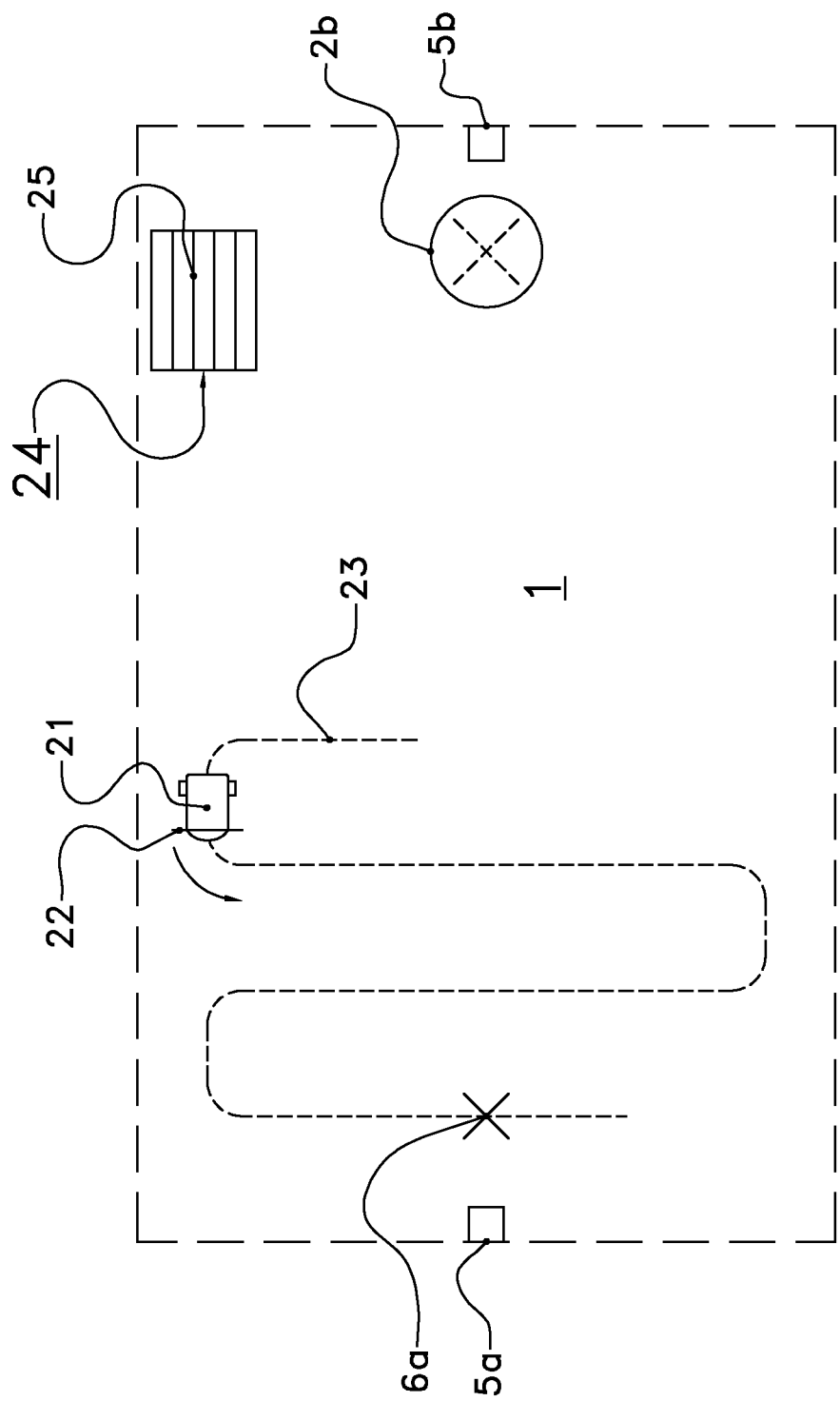
FIG. 3 shows a schematic top view of a further different embodiment of the system according to the invention.

FIG. 3 shows a schematic top view of a further different embodiment of the system according to the invention. A manure-shovelling vehicle 21 with a manure shovel 22 travels a manure-shovelling route 23 herein, and shovels manure to a manure disposal site 24 with a grating 25. Furthermore, a second vehicle 2b is drawn at a charging pillar 5b.

The second vehicle 2b is, for example, again a feed vehicle which can deposit feed along feedways not shown here. Here, the route followed by the vehicle 2b will intersect with the manure-shovelling route 23 of the vehicle 21. The advantage of the invention will therefore manifest itself in this case also. If the vehicle 2b has to move off, the control device (similarly not shown here) must have designated the presence status of the vehicle 21 as "present", or must have detected the status of all other vehicles as "present". This may occur here, for example if the vehicle 21 is located at the charging position 6'a at the charging pillar 5a. Alternatively, a detection device could be provided at the manure disposal site 24. Thus, the charging positions 6'a and 6'b and possibly the manure disposal site 24 can be designated as the predefined areas according to the invention. If both vehicles 21 and 2b are located at a predefined place, one of these vehicles can then begin to move off. If, on the other hand, one of the vehicles is travelling, i.e. has not been detected as "present", the other vehicle will not be able to begin to move off. Given that the predefined areas are located in this case on a route, the presence detection can be used additionally by the control device to adapt the route if required and guide it around all occupied predefined areas (charging positions, etc.).

Two vehicles are provided in each case in FIGS. 1 to 3. It will be clear that any multiple number of vehicles is similarly possible, and also any number of charging positions and other positions within the predefined place(s).

The invention claimed is:

1. A method for controlling a system including of:
   N unmanned autonomous vehicles, where N≥2,
   a control device for at least partially controlling at least one of the autonomous vehicles,
   an operational area with a floor over which the vehicles can move, wherein the vehicles are each configured to travel independently over one or more routes which are possible for that vehicle, wherein for at least one vehicle at least one of the possible routes intersects at least at one point with at least one possible route of another of the vehicles, and also
   at least one predefined place which adjoins the operational area, with in total M predefined positions which are each provided with at least one detection device to detect the presence of one of the vehicles and to signal the presence to the control device, where M≥2
   the method comprising:
   collecting in the control device of a presence status of each of the vehicles to determine a condition for the system, wherein the presence status comprises the presence of the vehicle at a predefined place as detected by the at least one detection device;
   determining on the basis of the presence statuses whether a condition is 'safe' for the system; and
   controlling, by way of the control device, a first vehicle to perform a travel action only if the condition is identified as 'safe' for the system and for this travel action, wherein the travel action is chosen from:
   a route travel action, comprising the travelling of a route through the operational area, starting from one of the predefined places, and
   an advancing action, comprising the travelling within one of the predefined places from a first detection device to a second detection device which is not yet occupied, in particular via an advancing route,
   and wherein the condition is 'safe', if:
   the travel action relates to a route travel action or an advancing action, and each of the vehicles has a presence status "detected as present at one of the predefined places", or
   the travel action relates to an advancing action, and at most one vehicle has the status "not present at one of the predefined places".

2. The method according to claim 1, further comprising:
   counting of the number of vehicles with the presence status "detected as present at one of the predefined places"; and
   determining that the condition of the system is "safe", if the number of vehicles is equal to N if the travel action relates to a route travel action, or
   the number of vehicles is greater than or equal to N−1 if the travel action relates to an advancing action.

3. The method according to claim 1, further comprising:
   for at least one vehicle to which the status "detected as present at one of the predefined places" applies:
   performing a first action at a first position within the predefined place,
   then performing an advancing action to a second position within the predefined place if the condition of the system is "safe", and
   performing a second action which differs from the first action.

4. The method according to claim 3, wherein the first action comprises one of charging of energy, including power, and loading of a material, including animal feed or a cleansing agent, or a combination thereof, and the second action comprises a different one of charging of energy, and loading of a material, including animal feed or a cleansing agent, or a combination thereof.

5. The method according to claim 1, wherein, in the case of an advancing action which is to be carried out, the condition is designated as "safe" only if the at most one vehicle with the status "not present at one of the predefined locations" is carrying out a route travel action.

6. The method according to claim 1, wherein at least one predefined place comprises an area of physical extent with at least two physically separated parking positions, each with a detection device to detect the presence of one of the vehicles and to signal the presence to the control device.

7. The method according to claim 1, wherein at least one predefined place comprises a separate and single parking position which is completely encircled by the operational area.

8. The method according to claim 1, wherein at least one parking position comprises at least one charging device for the charging of energy, including power, or a material, including animal feed or a cleansing agent or a combination thereof.

9. The method according to claim 6, wherein a parking position with a feed-loading device, also a charging device, and also with a dedicated detection device to detect the presence of one of the vehicles and to signal the presence to the control device are provided at the at least one predefined place, and in total at least N−1 separate charging devices are additionally provided at the at least one predefined place.

10. The method according to claim 1, wherein the detection device is configured to measure an electrical parameter, including a charge current, a conductivity or a resistance, and is furthermore configured to detect the presence status of a vehicle as "present" if the measured electrical parameter shows at least a predefined change or exceeds a predefined threshold value.

11. A system comprising:
N unmanned autonomous vehicles, where N≥2;
a control device for at least partially controlling at least one of the autonomous vehicles;
an operational area with a floor over which the vehicles can move, wherein the vehicles are each configured to travel independently over one or more routes which are possible for that vehicle, wherein for at least one vehicle at least one of the possible routes intersects at least at one point with at least one possible route of another of the vehicles;
at least one predefined place which adjoins the operational area, with in total M predefined positions which are each provided with at least one detection device to detect the presence of one of the vehicles and to signal the presence to the control device, where M≥2,
wherein the control device is
configured to
collect in the control device of a presence status of each of the vehicles to determine a condition for the system, and wherein the presence status comprises the presence of the vehicle at a predefined place as detected by the at least one detection device,
determine on the basis of the presence statuses whether a condition is 'safe' for the system,
control by way of the control device a first vehicle to perform a travel action only if the condition is identified as 'safe' for the system and for this travel action,
wherein the travel action is chosen from:
a route travel action, comprising the travelling of a route through the operational area, starting from one of the predefined places, and
an advancing action, comprising the travelling within one of the predefined places from a first detection device to a second detection device which is not yet occupied, in particular via an advancing route,
and wherein the condition is 'safe', if:
the travel action relates to a route travel action or an advancing action, and each of the vehicles has a presence status "detected as present at one of the predefined places", or
the travel action relates to an advancing action, and at most one vehicle has the status "not present at one of the predefined places".

12. The system according to claim 11, wherein, in the case of an advancing action which is to be carried out, the condition is designated as "safe" only if the at most one vehicle with the status "not present at one of the predefined locations" is carrying out a route travel action.

13. The system according to claim 11, wherein at least one predefined place comprises an area of physical extent with at least two physically separated parking positions, each with a detection device to detect the presence of one of the vehicles and to signal the presence to the control device.

14. The system according to claim 11, wherein at least one predefined place comprises a separate and single parking position which is completely encircled by the operational area.

15. The system according to claim 13, wherein at least one parking position comprises at least one charging device for the charging of energy, including power, or a material, including animal feed or a cleansing agent or a combination thereof.

16. The system according to claim 13, wherein a parking position with a feed-loading device, also a charging device, and also with a dedicated detection device to detect the presence of one of the vehicles and to signal the presence to the control device are provided at the at least one predefined place, and in total at least N−1 separate charging devices are additionally provided at the at least one predefined place.

17. The system according to claim 11, wherein the detection device is configured to measure an electrical parameter, including a charge current, a conductivity or a resistance, and is furthermore configured to detect the presence status of a vehicle as "present" if the measured electrical parameter shows at least a predefined change or exceeds a predefined threshold value.

18. A system comprising:
N unmanned autonomous vehicles, where N≥2;
control means for at least partially controlling at least one of the autonomous vehicles;
an operational area with a floor over which the vehicles can move, wherein the vehicles are each configured to travel independently over one or more routes which are possible for that vehicle, wherein for at least one vehicle at least one of the possible routes intersects at least at one point with at least one possible route of another of the vehicles;
at least one predefined place which adjoins the operational area, with in total M predefined positions which are each provided with at least one detection device to detect the presence of one of the vehicles and to signal the presence to the control means, where M≥2,
wherein the control means is further a means for
collecting a presence status of each of the vehicles to determine a condition for the system, and wherein the presence status comprises the presence of the vehicle at one of the predefined places as detected by the at least one detection device,
determining on the basis of the presence states whether a condition is 'safe' for the system,
controlling a first vehicle to perform a travel action only if the condition is identified as 'safe' for the system and for this travel action,
wherein the travel action is chosen from:
a route travel action, comprising the travelling of a route through the operational area, starting from one of the predefined places, and
an advancing action, comprising the travelling within one of the predefined places from a first detection device to a second detection device which is not yet occupied, in particular via an advancing route,
and wherein the condition is 'safe', if:
the travel action relates to a route travel action or an advancing action, and each of the vehicles has a presence status "detected as present at one of the predefined places", or
the travel action relates to an advancing action, and at most one vehicle has the status "not present at one of the predefined places".

* * * * *